(12) United States Patent
Dishman et al.

(10) Patent No.: US 7,826,236 B2
(45) Date of Patent: Nov. 2, 2010

(54) APPARATUS, SYSTEM, AND METHOD FOR A SWITCHING POWER SUPPLY WITH HIGH EFFICIENCY NEAR ZERO LOAD CONDITIONS

(75) Inventors: Cecil C. Dishman, Raleigh, NC (US); Randhir S. Malik, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 406 days.

(21) Appl. No.: 12/051,750

(22) Filed: Mar. 19, 2008

(65) Prior Publication Data

US 2009/0237045 A1    Sep. 24, 2009

(51) Int. Cl.
*H02M 3/335* (2006.01)
(52) U.S. Cl. .................................. 363/21.03; 363/95
(58) Field of Classification Search .................. 363/16, 363/17, 21.02, 21.03, 56.01, 56.02, 95, 98
See application file for complete search history.

(56) References Cited

U.S. PATENT DOCUMENTS

| | | | |
|---|---|---|---|
| 5,307,005 | A | 4/1994 | Ahladas et al. |
| 6,396,722 | B2 * | 5/2002 | Lin .............................. 363/98 |
| 6,804,129 | B2 * | 10/2004 | Lin .............................. 363/98 |
| 6,934,167 | B2 * | 8/2005 | Jang et al. ................. 363/21.02 |
| 7,109,693 | B2 | 9/2006 | Yoshida et al. |
| 7,158,390 | B2 | 1/2007 | Choi et al. |
| 7,499,299 | B2 * | 3/2009 | Phadke et al. ................. 363/89 |
| 7,616,457 | B2 * | 11/2009 | Yang ........................ 363/21.06 |
| 2003/0002301 | A1 * | 1/2003 | Yamagishi et al. ....... 363/21.12 |
| 2006/0279966 | A1 * | 12/2006 | Fan et al. ...................... 363/17 |
| 2007/0090816 | A1 | 4/2007 | Yang |
| 2007/0152647 | A1 | 7/2007 | Liao |
| 2008/0205089 | A1 * | 8/2008 | Zhu et al. ..................... 363/17 |
| 2009/0154204 | A1 * | 6/2009 | Taylor .......................... 363/52 |
| 2009/0213623 | A1 * | 8/2009 | Yang ........................... 363/49 |

FOREIGN PATENT DOCUMENTS

JP    2003216247    7/2003

* cited by examiner

*Primary Examiner*—Adolf Berhane
(74) *Attorney, Agent, or Firm*—Kunzler Needham Massey & Thorpe (57) ABSTRACT

An apparatus, system, and method are disclosed for a switching power supply with high efficiency near zero load conditions. A power detection module detects power provided to a load. The switching power supply is capable of operating in a zero voltage switching mode. The power detection module detects when the load power falls below a minimum power threshold. A low load power control module operates the switching power supply in a low load mode if the power detection module detects that the power to the load is below the minimum power threshold. The low load mode includes operating the power supply in zero voltage switching mode in response to an output voltage of the power supply falling below a regulation voltage threshold. The low load mode includes turning off switching of the power supply in response to the output voltage of the power supply rising above the regulation voltage threshold.

20 Claims, 5 Drawing Sheets

APPARATUS, SYSTEM, AND METHOD FOR A SWITCHING POWER SUPPLY WITH HIGH EFFICIENCY NEAR ZERO LOAD CONDITIONS

BACKGROUND OF THE INVENTION

1. Field of the Invention

This invention relates to power supplies, and more particularly relates to improving efficiency in a switching power supply operating near zero load conditions.

2. Description of the Related Art

A power supply, sometimes known as a power supply unit or PSU, is a device or system that supplies electrical or other types of energy to an output load or group of loads. A power supply, in some embodiments may be configured to convert power in one form to another form, such as converting AC power to DC power. The regulation of power supplies is typically done by incorporating circuitry to tightly control the output voltage or current of the power supply to a specific value. The specific value is closely maintained despite variations in the load presented to the power supply's output, or any reasonable voltage variation at the power supply's input. A switching power supply is a power supply that incorporates a switching regulator that typically switches a power transistor, usually a metal-oxide-semiconductor field-effect transistor ("MOSFET"), between saturation and cutoff with a controller to maintain a constant output voltage.

For example, in an electrical device such as a computer, a switching power supply is typically designed to convert an AC voltage input such as is traditionally provided by a conventional wall socket, into several low-voltage DC power outputs for transmission to the internal components of the device. Conversion is sometimes performed in stages that may include different power supply topologies such as a rectification stage, a boost stage, buck stage, or other topology.

During light load conditions and zero load conditions in a switching power supply, almost all losses are the result of interelectrode capacitances of the MOSFETs used as switches in the circuitry of the power supply. These losses are sometimes referred to as switching losses. Particularly in a power supply designed for high power applications, the MOSFET capacitances can be so large that the power supply may require a shutdown during low load periods due to excessive power dissipation. For example, in a typical switching power supply, the power loss during a no-load condition may be as high as 45-50 watts, and this power loss continues to increase as the MOSFET temperature rises. In cases where there is little or no forced air flow, the MOSFETs can reach very high temperatures which may result in catastrophic failure of the power supply. Conventional power supplies have failed to adequately address the problem of high switching losses in a switching power supply operating in a low load condition.

SUMMARY OF THE INVENTION

From the foregoing discussion, it should be apparent that a need exists for an apparatus, system, and method that improve efficiency in a switching power supply operating near zero load conditions. Beneficially, such an apparatus, system, and method would increase the efficiency of switching power supplies and prevent catastrophic failures that result from extremely high temperatures during periods of low load conditions.

The present invention has been developed in response to the present state of the art, and in particular, in response to the problems and needs in the art that have not yet been fully solved by currently available redundant power supplies.

The apparatus for increasing efficiency in a switching power supply operating near a zero load condition may include a power detection module that detects an amount of power provided by the switching power supply to a load. The switching power supply is typically capable of operating in a zero voltage switching mode. The power detection module may also be configured to detect when the amount of power provided by the switching power supply falls below a minimum power threshold. The apparatus may also include a low load power control module configured to operate the switching power supply in a low load mode in response to the power detection module detecting that the amount of power provided to the load is below the minimum power threshold.

The low load mode includes operating the switching power supply to provide energy to an output of the switching power supply in a zero voltage switching mode in response to an output voltage of the switching power supply falling below a regulation voltage threshold. The low load mode also includes turning off switching of the switching power supply in response to the output voltage of the switching power supply rising above a regulation voltage threshold where turning off switching of the switching power supply results in input energy not being transferred to the output of the switching power supply.

In a further embodiment of the apparatus, the switching power supply may include an output stage that includes of at least one switch and at least one diode configured in parallel with each switch. In such an embodiment, the low load mode may also include turning off each in the output stage of the switching power supply such that current flows through the at least one parallel diode instead of through the for the duration of operation in the low load mode.

In another embodiment, the switching power supply includes a phase-shift full-bridge capable of implementing a zero voltage switching mode. The phase-shift full-bridge is typically configured to control the passage of energy to the output of the power supply. In another embodiment, the phase-shift full-bridge is comprised of four metal-oxide-semiconductor field-effect transistor ("MOSFET") switches. In a further embodiment, the four MOSFET switches include a first switch and a second switch in series between a power source and ground and a third switch and a fourth switch in series between the power source and ground where a transformer is coupled to a node between the first switch and second switch and a node between the third switch and fourth switch. Thus, in the embodiment, operating the switching power supply to provide energy to the output of the switching power supply in a zero voltage switching mode includes alternately turning on and turning off the switches of the phase-shift full-bridge such that energy is transferred via the transformer to the output stage of the switching power supply.

In a further embodiment, the apparatus includes a high load power control module that operates the switching power supply in a high load mode in response to the power detection module detecting that the amount of power provided to the load is above the minimum power threshold.

In another embodiment, the voltage regulation threshold includes an upper voltage limit and a lower voltage limit. In the embodiment, the low load mode may operate to provide energy to the output of the switching power supply in a zero voltage switching mode in response to an output voltage of the switching power supply falling below the lower limit of the regulation voltage threshold. Further, the low load mode operates to turn off switching of the switching power supply in response to the output voltage of the switching power supply rising above the upper limit of the regulation voltage threshold.

In one embodiment, the minimum power threshold may correspond to a percentage of power capacity of the switching power supply at which the efficiency of the power supply is increased by operating in the low load mode. In another embodiment, the low load module includes a comparator circuit that compares the output voltage of the switching power supply with the regulation voltage threshold to provide a signal to turn off or on switching of the switching power supply when operating in the low load mode.

In an alternate embodiment, the apparatus may be a switching power supply with an output stage comprised of at least one switch and at least one diode configured in parallel with each switch. The apparatus includes a power detection module that detects an amount of power provided by a switching power supply to a load, where the switching power supply is capable of operating in a zero voltage switching mode. The power detection module detects when the amount of power provided by the switching power supply falls below a minimum power threshold. The apparatus includes a low load power control module configured to operate the switching power supply in a low load mode in response to the power detection module detecting that the amount of power provided to the load is below the minimum power threshold. The low load mode includes turning off each switch in the output stage of the switching power supply such that current flows through the at least one parallel diode instead of through the switch.

A system and method of the present invention are also presented. The system and method in the disclosed embodiments substantially include the steps necessary to carry out the functions presented above with respect to the operation of the described apparatus. The system, in one embodiment, includes a switching power supply that provides output power to a load. The system also includes a power detection module that detects an amount of power provided by a switching power supply to a load where the switching power supply is capable of operating in a zero voltage switching mode. The power detection module detects when the amount of power provided by the switching power supply falls below a minimum power threshold.

The system includes a low load power control module that operates the switching power supply in a low load mode in response to the power detection module detecting that the amount of power provided to the load is below the minimum power threshold. The low load mode includes operating the switching power supply to provide energy to an output of the switching power supply in a zero voltage switching mode in response to an output voltage of the switching power supply falling below a regulation voltage threshold. The low load mode also includes turning off switching of the switching power supply in response to the output voltage of the switching power supply rising above a regulation voltage threshold wherein turning off switching of the switching power supply results in energy not being passed to the output of the switching power supply.

In further embodiment, the system includes an electronic device that receives power from the switching power supply. In certain embodiments the electronic device may be one of a computer, router, switch, personal digital assistant, appliance, and digital media player. In one embodiment, the switching power supply integrated within the electronic device.

In one embodiment, the method disclosed herein may be implemented as a computer program product which includes some or all of the embodiments described above with regard to the apparatus and system. The computer program product includes detecting an amount of power provided by the switching power supply to a load. The switching power supply is typically capable of operating in a zero voltage switching mode. The computer program product includes detecting when the amount of power provided by the switching power supply falls below a minimum power threshold. The computer program product includes operating the switching power supply in a low load mode in response to detecting that the amount of power provided to the load is below the minimum power threshold.

The low load mode includes operating the switching power supply to provide energy to an output of the switching power supply in a zero voltage switching mode in response to an output voltage of the switching power supply falling below a regulation voltage threshold. The low load mode also includes turning off switching of the switching power supply in response to the output voltage of the switching power supply rising above a regulation voltage threshold wherein turning off switching of the switching power supply results in input energy not being transferred to the output of the switching power supply.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the software portions are stored on one or more computer readable media.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a computer readable medium may take any form capable of storing machine-readable instructions on a digital processing apparatus. A computer readable medium may be embodied by a transmission line, a compact disk, digital-video disk, a magnetic tape, a Bernoulli drive, a magnetic disk, a punch card, flash memory, integrated circuits, or other digital processing apparatus memory device.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 1:
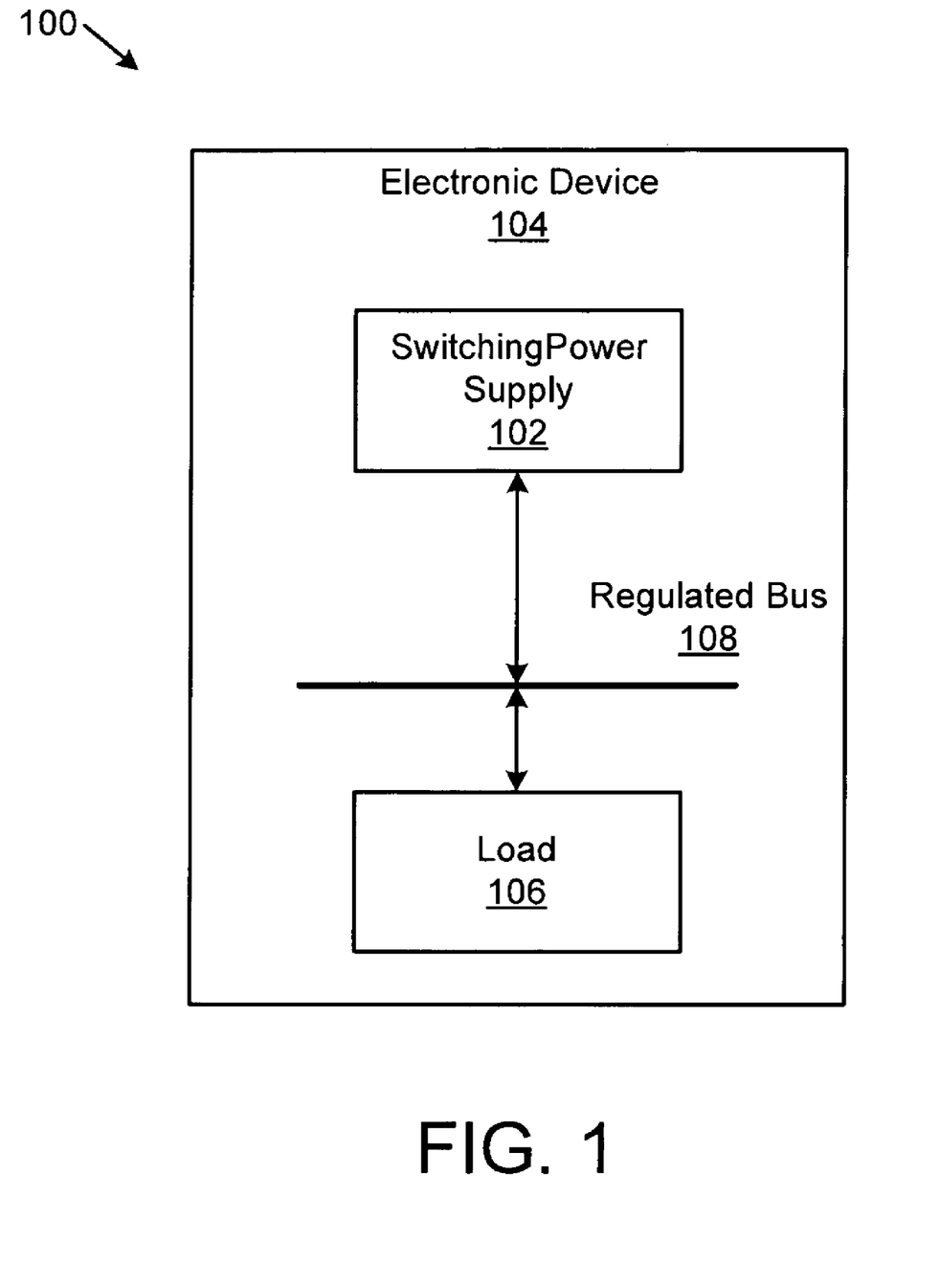
FIG. 1 is a schematic block diagram illustrating one embodiment of a system with a switching power supply in accordance with the present invention.

FIG. 1 is a schematic block diagram illustrating one embodiment of a system 100 with switching power supply 102 that operates efficiently near a zero load condition in accordance with the present invention. The system 100 includes an electronic device 104, a switching power supply 102, a regulated bus 108, and a load 106.

In one embodiment, the switching power supply 102 provides regulated power to the electronic device 104 in order to power various electronic systems and subsystems within the electronic device 104. The switching power supply 102 is typically connected to the electronic device 104 by a regulated bus 108. The regulated bus 108 and switching power supply 102 may be configured to provide one or more different voltages and currents to the electronic device 104. For example, in a typical switching power supply, voltages of +12 v, +5 v, +3.3 v, and −12 v are commonly provided.

The switching power supply 102 may include different functionalities and topologies. As will be recognized by those of skill in the art, typical topologies may include such rectification, boost, buck, or other topology. The switching power supply 102 may include various stages that combine one or more of these topologies in order provide one or more desired output voltages to the electronic device 104. The various stages of the switching power supply 102 allow the switching power supply 102 or stages within the switching power supply 102 to perform different functions such as rectification, voltage or current conversion, frequency changing, inversion, etc.

In various embodiments, the electronic device 104 may be a computer system, such as a desktop, laptop, or server, and the switching power supply 102 may be configured to provide power to the various components of the computer system. In other embodiments, the electronic device 104 may include devices such as routers, switches, personal digital assistants ("PDAs"), displays, appliances or other electronic devices as recognized by one of skill in the art. In one embodiment, the switching power supply 102 may be implemented within the same enclosure as the electronic device 104, such as within a computer tower case. In other embodiments, the switching power supply 102 may be implemented external to the electronic device 104 and may be connected to the electronic device 104 via a connection means such as a cord, cable, or bus such as in a blade center.

The electronic device 104 causes a load 106 to be applied to the switching power supply 102. The amount of load 106 may affect the performance of the switching power supply 102. The switching power supply 102 is preferably configured to operate efficiently in conjunction with a specified load 106. In one embodiment, the load 106 may vary depending on the operation characteristics of the electronic device 104 and the switching power supply 102 may be configured to adjust accordingly. For example, the switching power supply 102 may include a feedback signal for adjusting the power output characteristics of the switching power supply 102 in response to changes in the load 106. Typically, the switching power supply 102 regulates the voltage on the regulated bus 108 so as to provide substantially constant voltage levels to the electronic device 104 under varying load conditions.

In some circumstances, the electronic device 104 may be turned off, disconnected, or may be operated in a standby or hibernate type mode. In such a situation, the load 106 may become very low and, in some cases, the load 106 may become zero or very close to zero. When the load 106 decreases below a particular threshold, for example below 10-40% of the operating capacity, the switching power supply 102 may begin to substantially decrease in efficiency due to switching losses in the switching power supply 102. The present system 100, as will be described in detail below, operates the switching power supply 102 in low load mode when the load 106 falls below a pre-defined threshold such that switching losses are minimized or completely reduced so as to improve the overall efficiency of the switching power supply 102.

Figure 2:
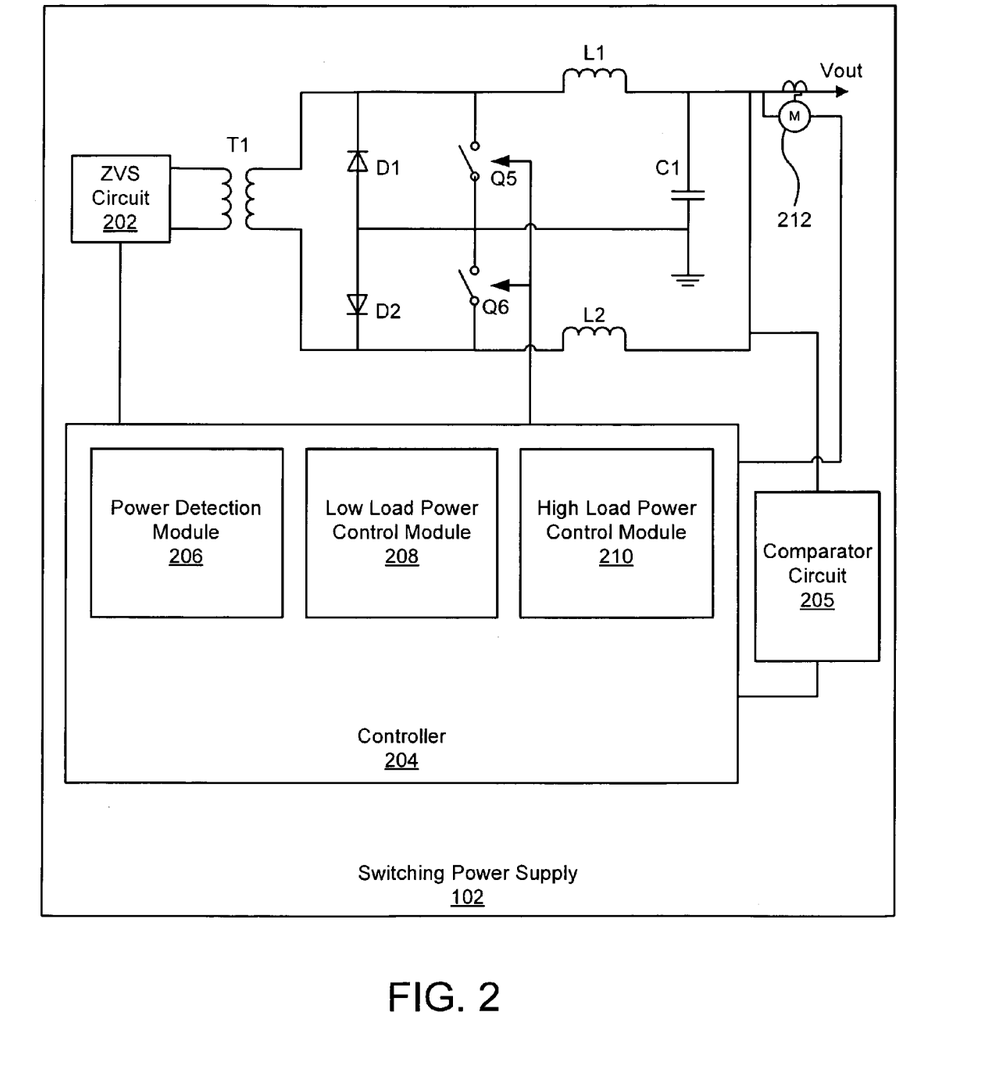
FIG. 2 is a schematic block diagram illustrating one embodiment of a switching power supply in accordance with the present invention.

FIG. 2 is a schematic block diagram illustrating one embodiment of a switching power supply 102 in accordance with the present invention. In the depicted embodiment, the switching power supply 102 includes circuitry for regulating an output voltage Vout, including a zero voltage switching ("ZVS") circuit 202 capable of operating the switching power supply 102 in a zero voltage switching mode. The switching power supply 102 may also include a controller 204 for controlling the operation of various components of the switching power supply 102. Of course, numerous other configurations are possible. For example, the controller 204 may be located outside the switching power supply or the circuitry may be reconfigured to provide different voltage and current outputs. In some embodiments, the switching power supply 102 may include numerous additional stages and circuitry for transforming and modifying voltages and currents that may be supplied by the switching power supply 102 to an electronic device 104.

In the depicted embodiment, the zero voltage switching circuit 202 operates to pass energy through a transformer T1 by causing a current to flow through the input side of the transformer T1. The zero voltage switching circuit 202 preferably comprises a phase-shift full-bridge made up of four switches. (See FIG. 3). In a preferred embodiment, the switches may be implemented as metal-oxide-semiconductor field-effect transistors ("MOSFETs"). However, the zero voltage switching circuit 202 may be implemented in other configurations and using other devices and transistors as will be recognized by one of ordinary skill in the art.

When the switching power supply 102 is turned on, energy is typically passed through the transformer T1 to an output stage of the switching power supply 102. As depicted, the output stage includes two switches Q5, Q6 each configured in parallel with a diode D1, D2. Of course, in other embodiments, the output stage may include other configurations that may include less than or more than the two switches Q5, Q6 each in parallel with a diode.

The switches Q5, Q6 operate to regulate the voltage Vout that is output by the output stage of the switching power supply 102. In one embodiment, the controller 204 may operate to turn on and turn off the switches Q5, Q6 in a regular, repeating pattern such that a constant or substantially constant voltage is maintained across the capacitor C1 and consequently at the output Vout of the output stage. During switching, current passes through inductors L1, L2 in order to facilitate regulation of the output voltage Vout. Various configurations of the circuitry may be utilized to provide different functionality such as for implementing a buck or boost converter. A feedback loop may be provided in some embodiments so that the controller 204 is able to more precisely control the output voltage Vout. A feedback loop might include a comparator circuit 205 for comparing the voltage Vout to a reference voltage and controlling switching to either lower or raise the output voltage Vout to match the reference voltage.

The controller 204 may include various modules for controlling the operation of the switching power supply 102 including a power detection module 206, a low load power control module 208, and a high load power control module 210.

In one embodiment, the power detection module 206 may detect an amount of power provided by the switching power supply 102 to the load 106. The power detection module 206 may also detect when the amount of power provided by the switching power supply 102 falls below or rises above a minimum power threshold. For example, the power detection module 206 may detect when the switching power supply 102 is operating at or below 10% of its capacity, thereby indicating a low load 106. In another example, the minimum power threshold might correspond to a 40% load as a percentage of the operating capacity of the switching power supply 102. Preferably, the minimum power threshold corresponds to an amount of power or percentage of output power capacity at which the efficiency of the switching power supply 102 may be increased by operating in a low load mode as will be described below. Of course, other means of establishing a minimum power threshold may also be implemented as will be recognized by one of skill in the art.

As depicted, the power detection module 206 is configured to measure power at the output of the switching power supply 102 via a power meter 212. Of course, in other embodiments, the power detection module 206 may be implemented in other configurations such as by measuring power at the input of the switching power supply 102 or in other locations as will be recognized by those of skill in the art. In one embodiment, the power meter 212 provides a signal back to the power detection module 206 which may be used to determine if the output power is above or below the minimum power threshold.

In the event that the power detection module 206 determines that the switching power supply 102 is providing an amount of power below the minimum power threshold, the low load power control module 208 may operate the switching power supply 102 in a low load mode. Preferably, the low load mode includes operating and/or configuring the circuitry of the switching power supply 102 to operate more efficiently with the smaller load 106. For example, operations may be performed to substantially reduce switching losses in the switching power supply 102, particularly when switching MOSFETs (e.g. Q5, Q6, etc.) within the switching power supply 102 exhibit very large capacitances.

In one embodiment, the low load power control module 208 implements a low load mode by turning off the switches Q5, Q6 in the output stage of the switching power supply 102 such that current flows through the parallel diodes D1, D2 instead of through the switches Q5, Q6 for the duration of operation in the low load mode. The diodes D1, D2 preferably perform the same function as the switches Q5, Q6 by creating and maintaining current paths in the circuit such that a constant output voltage Vout is maintained. However, by turning off the switches Q5, Q6, switching losses typically realized by those switches Q5, Q6 are substantially decreased or eliminated. For example, when operating in low load mode, the current is typically very small (e.g. 1 amp). For a 1 amp current, the switching losses in the switches Q5, Q6 may be very significant (e.g. 10-50 Watts) depending on the size of the switches Q5, Q6. However, drawing the same 1 amp current, the losses through a diode D1, D2, and in particular through a schottkey diode D1, D2, results in significantly less power loss (e.g. 0.5 Watts). Therefore, by turning off the switches Q5, Q6 in the output stage of the switching power supply 102 when there is a low or near zero load 106, the switching losses may be immediately and substantially reduced.

In a further embodiment, the low load power control module 208 may implement the low load mode by operating the switching power supply 102 to provide energy to the output of the switching power supply 102 in a zero voltage switching mode in response to the output voltage Vout of the switching power supply 102 falling below a regulation voltage threshold. Thus, when the load 106 is low or near zero, and when the output voltage Vout (e.g. the voltage stored across the capacitor C1) has drained to below a regulation threshold, then the zero voltage switching circuit 202 may be utilized to transfer energy through the transformer T1 to the output stage of the switching power supply 102 in order to drive the output voltage Vout at or above the regulation voltage threshold (e.g. 12 Volts). By operating switching in a zero voltage switching mode, the switching losses may be substantially reduced as will be recognized by one of skill in the art.

Zero voltage switching occurs when the voltage across a switch is at or near zero when the switch is opened or closed. (See FIG. 3 for one example of one circuit capable of zero voltage switching). Typically, zero voltage switching is achieved by utilizing the parasitic capacitances of the switches in the zero voltage switching circuit 202 and the magnetizing currents from the transformer T1 to cause a zero or near zero voltage condition across the switches during switching. The controller 204 drives the switches of the zero voltage switching circuit 202 such that zero voltage switching is achieved. In one embodiment, the zero voltage switching circuit 202 is operated at a particular duty cycle, or within a particular duty cycle range, in order to ensure operation in zero voltage switching mode.

The low load power control module 208 may further turn off switching of the switching power supply 102 in response to the output voltage Vout of the switching power supply 102 rising above the regulation voltage threshold. Preferably, turning off switching of the switching power supply 102 results in input energy not being transferred to the output of the switching power supply 102. Thus, once zero voltage switching is implemented and operated for a period of time to bring the output voltage Vout above the regulation threshold, then switching in the zero voltage switching circuit 202 may be turned off, thereby eliminating or substantially eliminating switching losses. Because, the load 106 is zero or near zero, the capacitor C1 may provide power for a relatively lengthy period of time before the output voltage Vout again falls below the regulation voltage threshold. In fact, in some embodiments, the time that switching is turned on and the time switching is turned off becomes proportional to the amount of load 106 on the switching power supply 102.

In one embodiment, the voltage regulation threshold may include an upper voltage limit (e.g. 12.4 volts) and a lower voltage limit (e.g. 11.6 volts). In such a case, the low load mode operates to turn on switching in the zero voltage switching circuit 202 in response to the output voltage Vout falling below the lower limit of the regulation voltage threshold. Conversely, in the embodiment the low load mode operates to turn off switching in the zero-voltage switching circuit 202 in response to the output voltage Vout rising above the upper limit of the regulation voltage. The low load power control module 208 may be implemented using a comparator circuit 205 to compare the output voltage Vout to a reference voltage. In one embodiment, the comparator circuit 205 may provide a signal to turn off or on switching of the switching power supply 102. Typically, the comparator circuit 205 has a built in upper limit and lower limit to create a natural hysteresis band for regulating the output voltage Vout. For example, a comparator with a reference voltage set to 12 Volts may have a natural upper limit of 12.2 volts and a natural lower limit of 11.8 volts.

The high load power control module 210 is configured to operate the switching power supply 102 in a high load mode in response to the power detection module 206 detecting that the amount of power provided to the load 106 is above the minimum power threshold. Preferably, during the high load mode, the switching power supply 102 operates to regulate the output voltage Vout by utilizing switching in the switches Q5, Q6 in the output stage of the switching power supply 102, as well as by utilizing switching in zero voltage switching or non-zero voltage switching mode in the zero voltage switching circuit 202 such that energy is transferred to the output of the switching power supply 102. Thus, if the load 106 is at a normal or elevated level, then the switching power supply 102 operates with its normal switching operations, but when the load 106 falls below a threshold, then the switching power supply 102 operates to minimize losses and improve efficiency in the low load mode.

Figure 3:
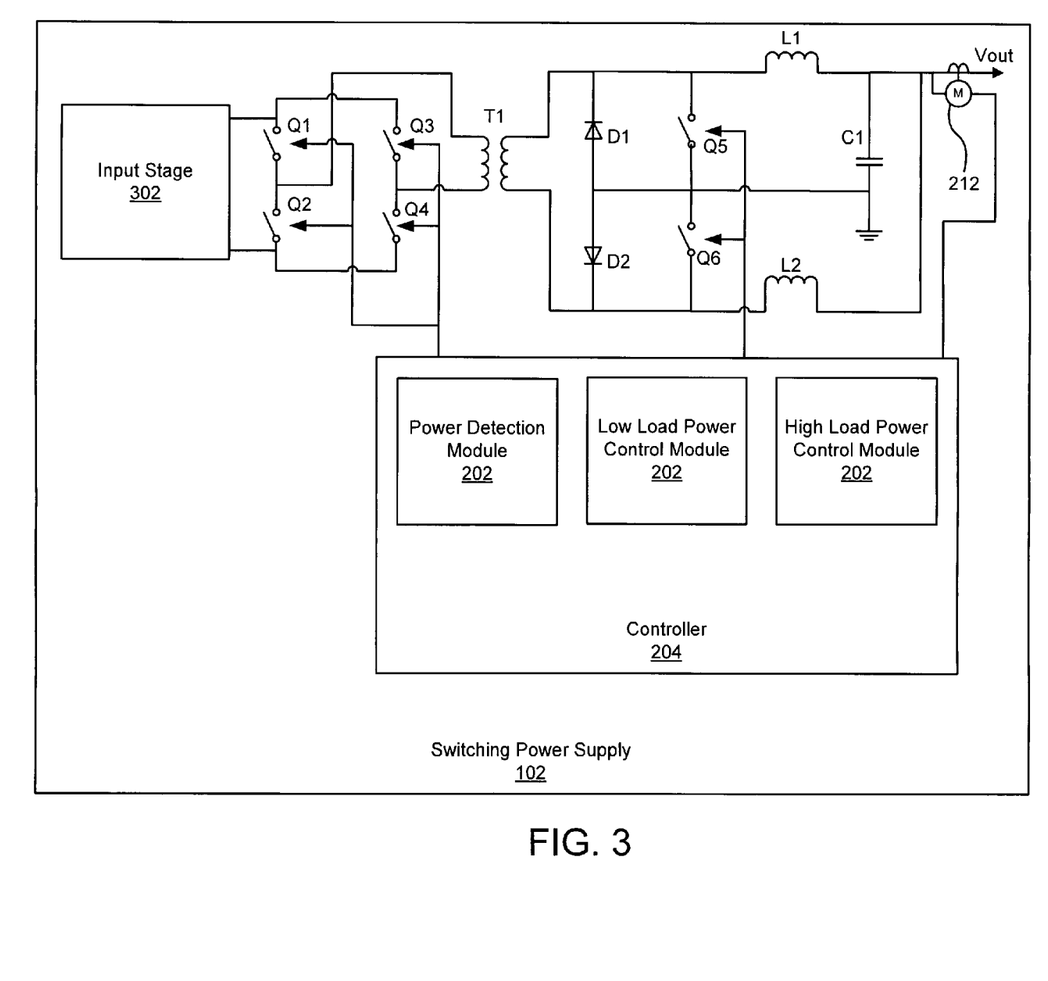
FIG. 3 is a schematic block diagram illustrating an additional embodiment of a switching power supply in accordance with the present invention.

FIG. 3 is a schematic block diagram illustrating an additional embodiment of a switching power supply 102 in accordance with the present invention. Specifically, as depicted the switching power supply 102 includes a phase-shift full-bridge stage comprised of four switches Q1, Q2, Q3, Q4. Preferably, the phase-shift full-bridge configuration is made up of MOSFETs capable of operating in zero voltage switching mode so as to minimize switching losses when operating in the low load mode. The phase-shift full-bridge includes a first switch Q1 and a second switch Q2 in series between a power source (input stage 302) and ground, and a third switch Q3 and a fourth switch in series between the power source and ground. A transformer T1 is coupled to a node between the first switch Q1 and the second switch Q2 and a node between the third switch Q3 and fourth switch Q4.

In one embodiment, an input stage 302 provides power to the phase-shift full-bridge. The input stage 302, in various embodiments, may include a power source such as a voltage source or an additional stage of the switching power supply 102, such as a boost or buck-type stage. The switches Q1, Q2, Q3, Q4 of the phase-shift full-bridge are controlled by the controller 204 to pass energy through the transformer T1 to the output stage of the switching power supply 102.

For example, the switches Q1, Q2, Q3, Q4 may be alternatively turned off and on in various patterns and configurations to cause a current to flow through the input side of the transformer T1. In one embodiment, the first and fourth switches Q1, Q4 may be turned on and the second and third switches Q2, Q3 may be turned off thereby causing a current path to be created through the first and fourth switches such that current travels through the first switch Q1 to the top input node of the transformer T1, through the transformer T1, and back through the fourth switch Q4. Conversely, if the first and fourth switches Q1, Q4 are turned off, and the second and third switches Q1, Q3 are turned on, then current will flow through the transformer T1 in the opposite direction. By timing the switching between turning on/off the first and fourth switches Q1, Q4 and turning on/off the second and third Q2, Q3, switches, zero voltage switching can be implemented as will be recognized by one of skill in the art.

As described above, when the switching power supply 102 is operating in low load mode, the phase-shift full-bridge may be operated in zero voltage switching mode to reduce switching losses. Furthermore, switching may be turned off altogether in response to the output voltage Vout rising above a regulation voltage threshold. In such circumstances, energy will stop being passed through the transformer T1 and switching losses may be eliminated or substantially reduced. In other embodiments, the zero voltage switching circuit may be implemented in other configurations such as by using a half-bridge as will be recognized by those of skill in the art.

Figure 4:
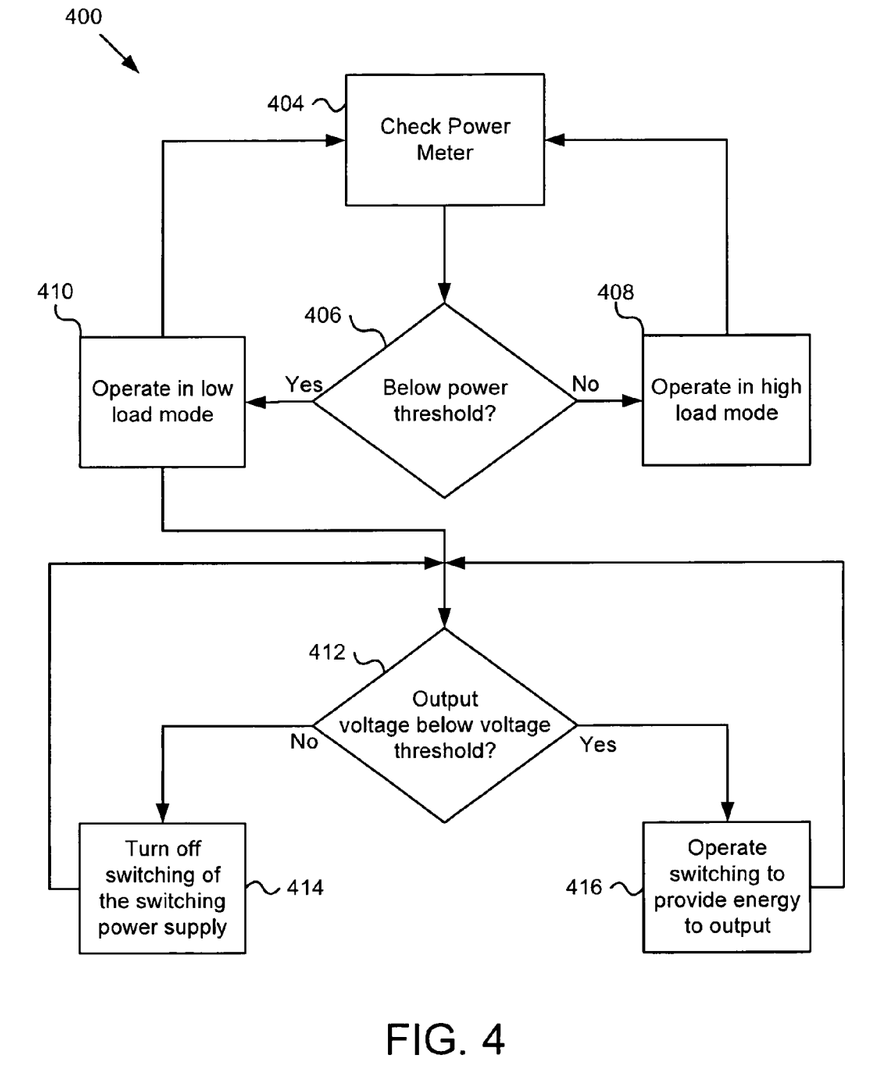
FIG. 4 is a schematic flow chart diagram illustrating one embodiment of a method for increasing efficiency in a switching power supply operating with a low load condition.

FIG. 4 is a schematic flow chart diagram illustrating one embodiment of a method 400 for increasing efficiency in a switching power supply 102 operating with a low load condition. The method 400, in various embodiments, may include steps and operations to implement the embodiments and configurations described above with regard to FIGS. 1-3.

The method 400 begins when the power detection module 206 checks 404 a power meter 212 to determine the amount of power provided by the switching power supply 102. The power detection module 206 determines 406 whether the amount of power is below a minimum power threshold, thereby indicating whether the load 106 on the switching power supply 102 is low or high.

If the amount of power provided by the switching power supply 102 is above the minimum power threshold, then the high load power control module 210 operates the switching power supply 102 in high load mode. High load mode, typically includes normal operation of the switching power supply 102 by operating switching of the switching power supply 102 with a conventional duty cycle and normal switching losses.

If the amount of power provided by the switching power supply 102 is below the minimum power threshold, then low load power control module 208 operates 410 the switching power supply 102 in low load mode in order to increase efficiency and minimize switching losses that may result in a failure of the switching power supply 102. As described above, operating in the low load mode may include turning off switches Q5, Q6 in the output stage of the switching power supply 102 and using diodes D1, D2 in their place. The low load mode may also include operating the switching power supply 102 in zero voltage switching mode to reduce losses during switching, as well as completely turning off switching of the switching power supply 102 when the output voltage Vout is above a regulation threshold.

In one embodiment of the low load mode, the low load power control module 208 determines 412 if the output voltage Vout is below a regulation voltage threshold (e.g. 12 Volts). If the output voltage Vout is not below the regulation voltage threshold, then the low load power control module 208 turns off 414 switching of the switching power supply 102 such that energy is not passed to the output of the switching power supply 102, and such that switching losses are eliminated or reduced. If the output voltage Vout has fallen below the regulation voltage threshold, then the zero voltage switching circuit 202 is operated 416 (switching is turned on) to provide energy through the transformer T1 to the output of the switching power supply 102 in a zero voltage switching mode. These steps 412-416 are continuously and repeatedly performed during operation in the low load mode. Thus, the output voltage Vout is regulated in this manner until the amount of power provided by the switching power supply 102 rises 406 above the minimum power threshold, thereby causing the switching power supply 102 to operate 408 in a high load mode.

In this manner, the efficiency of the switching power supply 102 is greatly improved at low loads, and switching losses at low loads are substantially reduced or eliminated thereby preventing some catastrophic failures of the switching power supply 102.

Figure 5:
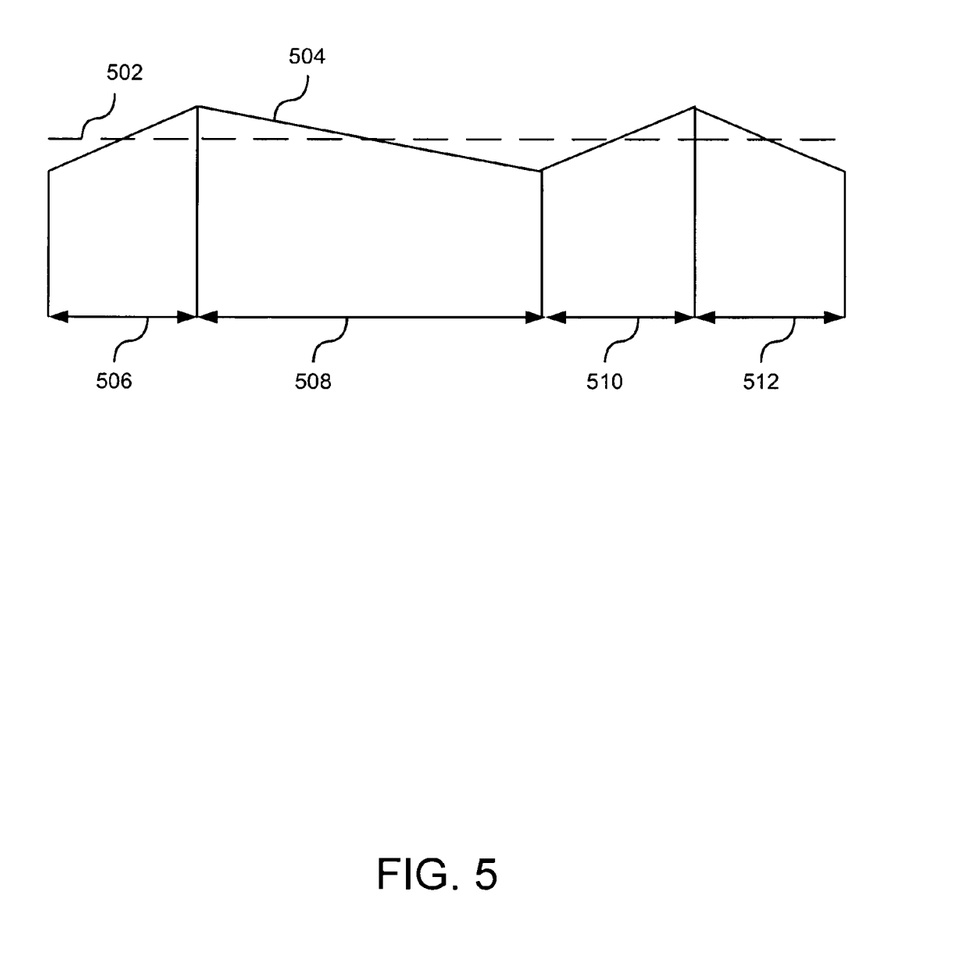
FIG. 5 is a schematic block diagram illustrating the efficiency of operation of the switching power supply in accordance with the present invention.

FIG. 5 is a schematic block diagram illustrating the efficiency of operation of the switching power supply 102 in accordance with the present invention. The dashed line 502 represents the voltage regulation threshold (e.g. 12 Volts) described above with regard to the various embodiments of the switching power supply 102. The solid line 504 represents the actual output voltage Vout during operation of the switching power supply 102. The period segment lines 506, 508, 510, 512 represent various periods of operation of the switching power supply 102 in low load mode.

During the first segment 506, the switching power supply 102 is operating in low load mode, the output voltage Vout 504 begins at below the regulation voltage threshold 502, and the zero voltage switching circuit 202 is driven to operate in zero voltage switching mode. Several switching period take place in zero voltage switching mode to cause the output voltage Vout 504 to rise above the regulation voltage threshold 502. Once the output voltage Vout 504 is above the regulation voltage threshold, switching in the power supply 102 is turned off. Thus, the second segment 508 depicts a relatively lengthy period of time during which the load 106 is zero or close to zero, and during which the output voltage Vout 504 slowly falls below the regulation voltage threshold 502.

During the third and fourth segments 510, 512, the switching power supply 102 is operating in low load mode with a slightly larger load 106. Thus, the output voltage Vout 504 is regulated to just above the voltage regulation threshold 502, but due to the slightly heavier load 106, the amount of time required for the output voltage Vout 504 to fall below the regulation voltage threshold is much less. In this manner, the time that switching is turned on and the time that switching is turned off (Ton/Toff) becomes proportional to the amount of load 106 on the switching power supply 102. By operating in this way, switching losses are greatly reduced for low load and zero load conditions because when the switches are off, switching losses are typically non-existent.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus for increasing efficiency in a switching power supply operating near a zero load condition, the apparatus comprising:

a power detection module that detects an amount of power provided by a switching power supply to a load, the switching power supply capable of operating in a zero voltage switching mode, the power detection module further detecting when the amount of power provided by the switching power supply falls below a minimum power threshold; and a low load power control module configured to operate the switching power supply in a low load mode in response to the power detection module detecting that the amount of power provided to the load is below the minimum power threshold, the low load mode comprising operating the switching power supply to provide energy to an output of the switching power supply in a zero voltage switching mode in response to an output voltage of the switching power supply falling below a regulation voltage threshold; and turning off switching of the switching power supply in response to the output voltage of the switching power supply rising above a regulation voltage threshold wherein turning off switching of the switching power supply results in energy not being transferred to the output of the switching power supply.

2. The apparatus of claim 1, wherein the switching power supply comprises an output stage comprised of at least one switch and at least one diode configured in parallel with each at least one switch, the low load mode further comprising turning off each at least one switch in the output stage of the switching power supply such that current flows through the at least one parallel diode instead of through the at least one switch for the duration of operation in the low load mode.

3. The apparatus of claim 1, wherein the switching power supply comprises a phase-shift full-bridge capable of implementing a zero voltage switching mode, the phase-shift full-bridge configured to control the passage of energy to the output of the power supply.

4. The apparatus of claim 3, wherein the phase-shift full-bridge is comprised of four metal-oxide-semiconductor field-effect transistor ("MOSFET") switches.

5. The apparatus of claim 4, wherein the four MOSFET switches comprise a first switch and a second switch in series between a power source and ground and a third switch and a fourth switch in series between the power source and ground wherein a transformer is coupled to a node between the first switch and second switch and a node between the third switch and fourth switch.

6. The apparatus of claim 5, wherein operating the switching power supply to provide energy to the output of the switching power supply in a zero voltage switching mode comprises alternately turning on and turning off switches of the phase-shift full-bridge such that energy is transferred via the transformer to the output stage of the switching power supply.

7. The apparatus of claim 1, further comprising a high load power control module configured to operate the switching power supply in a high load mode in response to the power detection module detecting that the amount of power provided to the load is above the minimum power threshold.

8. The apparatus of claim 1, wherein the voltage regulation threshold comprises an upper voltage limit and a lower voltage limit, the low load mode operating to provide energy to the output of the switching power supply in a zero voltage switching mode in response to an output voltage of the switching power supply falling below the lower limit of the regulation voltage threshold, the low load mode operating to turn off switching of the switching power supply in response to the output voltage of the switching power supply rising above the upper limit of the regulation voltage threshold.

9. The apparatus of claim 1, wherein the minimum power threshold corresponds to a percentage of output power capacity of the switching power supply at which the efficiency of the power supply is increased by operating in the low load mode.

10. The apparatus of claim 1, wherein the low load module further comprises a comparator circuit that compares the output voltage of the switching power supply with the regulation voltage threshold to provide a signal to turn off or on switching of the switching power supply when operating in the low load mode.

11. A system for increasing efficiency in a switching power supply operating near a zero load condition, the system comprising:

a switching power supply that provides output power to a load;

a power detection module that detects an amount of power provided by the switching power supply to the load, the switching power supply capable of operating in a zero voltage switching mode, the power detection module further detecting when the amount of power provided by the switching power supply falls below a minimum power threshold; and a low load power control module configured to operate the switching power supply in a low load mode in response to the power detection module detecting that the amount of power provided to the load is below the minimum power threshold, the low load mode comprising operating the switching power supply to provide energy to an output of the switching power supply in a zero voltage switching mode in response to an output voltage of the switching power supply falling below a regulation voltage threshold; and turning off switching of the switching power supply in response to the output voltage of the switching power supply rising above a regulation voltage threshold wherein turning off switching of the switching power supply results in energy not being transferred to the output of the switching power supply.

12. The system of claim 11, further comprising an electronic device that receives power from the switching power supply.

13. The system of claim 12, wherein the electronic device is one of a computer, router, switch, personal digital assistant, appliance, and digital media player.

14. The system of claim 11, wherein the switching power supply is integrated within the electronic device.

15. A computer program product comprising a computer readable medium having computer usable program code stored on a tangible medium and executable on a processor, the computer program product comprising:

detecting an amount of power provided by a switching power supply to a load, the switching power supply capable of operating in a zero voltage switching mode;

detecting when the amount of power provided by the switching power supply falls below a minimum power threshold; and operating the switching power supply in a low load mode in response to detecting that the amount of power provided to the load is below the minimum power threshold, the low load mode comprising operating the switching power supply to provide energy to an output of the switching power supply in a zero voltage switching mode in response to an output voltage of the switching power supply falling below a regulation voltage threshold; and turning off switching of the switching power supply in response to the output voltage of the switching power supply rising above a regulation voltage threshold wherein turning off switching of the switching power supply results in energy not being transferred to the output of the switching power supply.

16. The Computer Program Product of claim 15, wherein the switching power supply comprises an output stage comprised of at least one switch and at least one diode configured in parallel with each at least one switch, the low load mode further comprising turning off each at least one switch in the output stage of the switching power supply such that current flows through the at least one parallel diode instead of through the at least one switch for the duration of operation in the low load mode.

17. The Computer Program Product of claim 15, wherein operating the switching power supply to provide energy to the output of the switching power supply in a zero voltage switching mode comprises alternately turning on and turning off different switches of a phase-shift full-bridge such that energy is transferred via the transformer to the output stage of the switching power supply.

18. A switching power supply with increased efficiency operating near a zero load condition, the apparatus comprising:

an output stage comprised of at least one switch and at least one diode configured in parallel with each at least one switch;

a power detection module that detects an amount of power provided by a switching power supply to a load, the switching power supply capable of operating in a zero voltage switching mode, the power detection module further detecting when the amount of power provided by the switching power supply falls below a minimum power threshold; and a low load power control module configured to operate the switching power supply in a low load mode in response to the power detection module detecting that the amount of power provided to the load is below the minimum power threshold, the low load mode comprising turning off each at least one switch in the output stage of the switching power supply such that current flows through the at least one parallel diode instead of through the at least one switch.

19. The switching power supply of claim 18, wherein the low load mode further comprises operating the switching power supply to provide energy to an output of the switching power supply in a zero voltage switching mode in response to an output voltage of the switching power supply falling below a regulation voltage threshold.

20. The switching power supply of claim 19, wherein the low load mode further comprises turning off switching of the switching power supply in response to the output voltage of the switching power supply rising above a regulation voltage threshold wherein turning off switching of the switching power supply results in input energy not being transferred to the output of the switching power supply.

* * * * *